US006020938A

United States Patent [19]

Nakamura et al.

[11] Patent Number: 6,020,938

[45] Date of Patent: Feb. 1, 2000

[54] MATRIX-TYPE DISPLAY DEVICE

[75] Inventors: Moritaka Nakamura, Yamatotakada; Kouji Kumada; Yukihiro Nakahara, both of Tenri, all of Japan

[73] Assignee: Sharp Kabushiki Kaisha, Osaka, Japan

[21] Appl. No.: 08/813,820

[22] Filed: Mar. 6, 1997

[30] Foreign Application Priority Data

Mar. 7, 1996 [JP] Japan .................................... 8-050356

[51] Int. Cl.[7] ........................................ H04N 3/14

[52] U.S. Cl. .......................... 348/792; 348/793; 348/800; 345/100

[58] Field of Search .................................... 348/792, 793, 348/441, 443, 445, 446, 448, 454, 455, 458, 704, 581, 576, 800, 801, 802, 790, 791; 345/10; H04N 3/14

[56] References Cited

U.S. PATENT DOCUMENTS 4,447,812 5/1984 Soneda et al. ............................ 345/98
5,461,424 10/1995 Shimizu .................................. 348/443
5,488,389 1/1996 Nakanishi et al. ...................... 348/443

FOREIGN PATENT DOCUMENTS 0 686 960 A2 12/1995 European Pat. Off. .
37 20 353 A1 1/1989 Germany .

*Primary Examiner*—Michael H. Lee
*Attorney, Agent, or Firm*—David G. Conlin; David A. Tucker

[57] ABSTRACT

A matrix-type display device is a liquid crystal device having 240 vertical lines on a display screen, and is provided with a driving circuit which writes a signal simultaneously into two vertical lines in one in every three scanning lines of an EDTV2 signal, in which a number of scanning lines is 180 per field, when an image based on the EDTV2 signal is displayed on the display screen. As a result, a circuit having a complicated configuration is not required, and an image based on the EDTV2 signal can be displayed on the whole display screen of a liquid crystal module having 240 vertical lines without a non-image portion.

11 Claims, 11 Drawing Sheets

FIG. 1

| NUMBER OF VERTICAL LINES | ODD FIELD | EVEN FIELD | • • • • |
|---|---|---|---|
| G0 | | 0+ | • • • • |
| G1 | 1+ | 2− | • • • • |
| G2 | 1+ | 2− | • • • • |
| G3 | 3− | 4+ | • • • • |
| G4 | 5+ | 6− | • • • • |
| G5 | 7− | 8+ | • • • • |
| G6 | 7− | 8+ | • • • • |
| G7 | 9+ | 10− | • • • • |
| G8 | 11− | 12+ | • • • • |
| G9 | 13+ | 14− | • • • • |
| G10 | 13+ | 14− | • • • • |
| ⋮ | ⋮ | ⋮ | |
| ⋮ | ⋮ | ⋮ | |
| G240 | 359− | 360+ | • • • • |

FIG. 3

| NUMBER OF VERTICAL LINES | ODD FIELD | EVEN FIELD | · · · · |
|---|---|---|---|
| G 0 | | 0 + | · · · · |
| G 1 | 1 + | 0 + | · · · · |
| G 2 | 1 + | 2 − | · · · · |
| G 3 | 3 − | 4 + | · · · · |
| G 4 | 5 + | 6 − | · · · · |
| G 5 | 7 − | 6 − | · · · · |
| G 6 | 7 − | 8 + | · · · · |
| G 7 | 9 + | 1 0 − | · · · · |
| G 8 | 1 1 − | 1 2 + | · · · · |
| G 9 | 1 3 + | 1 2 + | · · · · |
| G 1 0 | 1 3 + | 1 4 − | · · · · |
| ⋮ | ⋮ | ⋮ | |
| ⋮ | ⋮ | ⋮ | |
| G 2 4 0 | 3 5 9 − | 3 6 0 + | · · · · |

FIG. 4

| NUMBER OF VERTICAL LINES | ODD FIELD | EVEN FIELD | • • • • |
|---|---|---|---|
| G 0 | | | |
| G 1 | 1 + | 0 − | • • • • |
| G 2 | 1 + | 2 + | • • • • |
| G 3 | 3 − | 4 − | • • • • |
| G 4 | 5 + | 4 − | • • • • |
| G 5 | 7 − | 6 + | • • • • |
| G 6 | 7 − | 8 − | • • • • |
| G 7 | 9 + | 1 0 + | • • • • |
| G 8 | 1 1 − | 1 0 + | • • • • |
| G 9 | 1 3 + | 1 2 − | • • • • |
| G 1 0 | 1 3 + | 1 4 + | • • • • |
| ⋮ | ⋮ | ⋮ | |
| G 2 4 0 | 3 5 9 − | 3 6 0 − | • • • • |

MATRIX-TYPE DISPLAY DEVICE

FIELD OF THE INVENTION

The present invention relates to a matrix-type display device such as a liquid crystal display device, more specifically, a matrix-type display device which is capable of displaying an image which is based on a video signal whose scanning lines are fewer than vertical lines of a display screen, on the whole display screen without a non-image portion.

BACKGROUND OF THE INVENTION

Present color broadcasting in Japan and the U.S.A. adopts the NTSC method for executing 2:1 interlaced scanning using 525 scanning lines. On the other hand, a display screen has been wider so that a display screen meets needs for a realistic image with high quality. Accordingly, the wide television signal broadcasting method, which can satisfy both the compatibility with present broadcasting and needs for wider display screen, is suggested. In this method, if, for example, a letter box image is displayed, an effective number of scanning lines is decreased from 480 to 360 per frame, and thus, with non-image portions in top and bottom sections, the image whose aspect ratio becomes 16:9 is displayed. Moreover, in order to improve vertical resolution, components from 360 TVs to 480 TVs should be transmitted as a vertical reinforcing signal particularly in the case of a still picture.

FIG. 11 is a block diagram which shows one section of a typical signal processing method for an EDTV2 signal. The EDTV2 (Extended Definition Television-2) signal is a TV signal for the so-called second generation of "Clear Vision", which is suggested in order to realize display of a wide image with high quality, and a number of scanning lines for 1 field is 180. In the above signal processing method, color signals, etc. of the EDTV2 signal are processed successively in an interlacing-sequential converting circuit 51, a scanning line number converting circuit 52, a matrix circuit 53, a D-A converter 54 and a control circuit 55. Then, the signals are inputted into a scanning electrode driving circuit 56 and a signal electrode driving circuit 57. When driven by these driving circuits 56 and 57, an image based on the EDTV2 signal is displayed on a display 58 having, for example, 240 vertical lines.

In the signal processing method shown in FIG. 11, a number of scanning lines of a video signal is set to 480 (240 per field), and an image is displayed on the display 58. In order to gain a vertical reinforcing signal for increasing the components from 360 TV lines to 480 TV lines, the scanning line number converting circuit 52 is provided, but a lot of line memories and filters are required.

In the case of CRT, as described in Japanese Unexamined Patent Publication No. 7-67051/1995 (Tokukaihei 7-67051), for example, instead of the above processing method, TV signals are discriminated and a deflection angle is controlled. On the other hand, in the case of a liquid crystal display device which is a kind of a matrix-type display device, instead of the above processing method, (1) a calculating circuit having a complicated circuit configuration is provided or (2) as described in Japanese Unexamined Patent Publication No. 7-175451/1995 (Tokukaihei 7-175451), a signal electrode driving circuit which increases a scanning frequency and time-division-drives a signal electrode using a plurality of frames, and a scanning electrode driving circuit which drives a scanning electrode of a liquid crystal display panel are provided.

As mentioned above, in a conventional matrix-type display device, in the case where an image, which is based on a video signal in which a number of scanning lines is smaller than a number of vertical lines of a display screen, is displayed on the whole display screen without a non-image portion, a circuit having a complicated circuit configuration should be provided. Namely, the scanning line number converting circuit 52, the calculating circuit or the circuit having a complicated circuit configuration disclosed in Japanese Unexamined Patent Publication No. 7-175451/1995 (Tokukaihei 7-175451) is required. The provision of such a circuit having a complicated circuit configuration causes a steep rise in costs.

As mentioned above, in the display method in the conventional matrix-type display device, since a lot of hardware and complicated circuits are required, the method has a disadvantage of great cost.

SUMMARY OF THE INVENTION

The present invention is invented in order to solve the above problems, and it is an object of the present invention to provide a matrix-type display device which is capable of displaying an image, which is based on a video signal in which a number of scanning lines is smaller than a number of vertical lines of a display screen, on a whole screen without a non-image portion, and is capable of realizing reduction in costs.

In order to achieve the above object, a matrix-type display device of the present invention, includes:

Y-numbered vertical lines of a display screen; and a driving circuit for when an image based on a video signal having X-numbered (X<Y) scanning lines is displayed on the display screen, writing the video signal simultaneously into a plurality of lines of the vertical lines at a part of a predetermined period.

In accordance with the above arrangement, when a video signal is written simultaneously into a plurality of the vertical lines at one portion of the predetermined period, an image based on the video signal can be displayed on the whole display screen without a non-image portion. Here, the predetermined period is a selecting period for successively selecting a plurality of the vertical lines, and the video signal is written simultaneously into a plurality of the vertical lines at one portion of the predetermined period. Any number of the vertical lines may be selected for the predetermined period. The later-mentioned embodiment explains an example that for the selecting period for selecting four vertical lines, a video signal is written simultaneously into two of the four vertical lines and a vertical enlargement ratio of display becomes 4/3 times.

Since the above arrangement does not require a lot of hardware and a complicated circuit, a decrease in fraction defective and simplification of a device can be achieved in addition to a decrease in costs. Therefore, a matrix-type display device, which is capable of displaying a realistic image with high quality on a wide display screen, can be provided at a low price.

It is preferable that the driving circuit controls a rate of writing the video signal simultaneously into a plurality of the vertical lines according to an area of the display screen.

In addition, it is preferable that a number of a plurality of the vertical lines into which the video signal is written simultaneously is two.

In additions it is preferable that the video signal is a wide EDTV2 signal in which a number of scanning lines on a main display portion is 180 per field, and the display screen has a wide aspect ratio which is wider than an aspect ratio of 4:3.

For fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory drawing which one driving example for displaying an image, which is based on a video signal in which a number of scanning lines is 180 per field, on a whole display screen having 240 vertical lines in a liquid crystal display device according to one embodiment of the present invention.

FIG. 3 is an explanatory drawing which shows another driving example for displaying the image, which is based on the video signal in which a number of scanning lines is 180 per field, on the whole display screen having 240 vertical lines in the liquid crystal display device.

FIG. 4 is an explanatory drawing which shows still another driving example for displaying the image, which is based on the video signal in which a number of scanning lines is 180 per field, on the whole display screen having 240 vertical lines in the liquid crystal display device.

DETAILED DESCRIPTION OF THE PREFERRED EMBODIMENTS

Embodiment 1

The following describes one embodiment of the present invention on reference to FIGS. 1 through 10.

Figure 9:
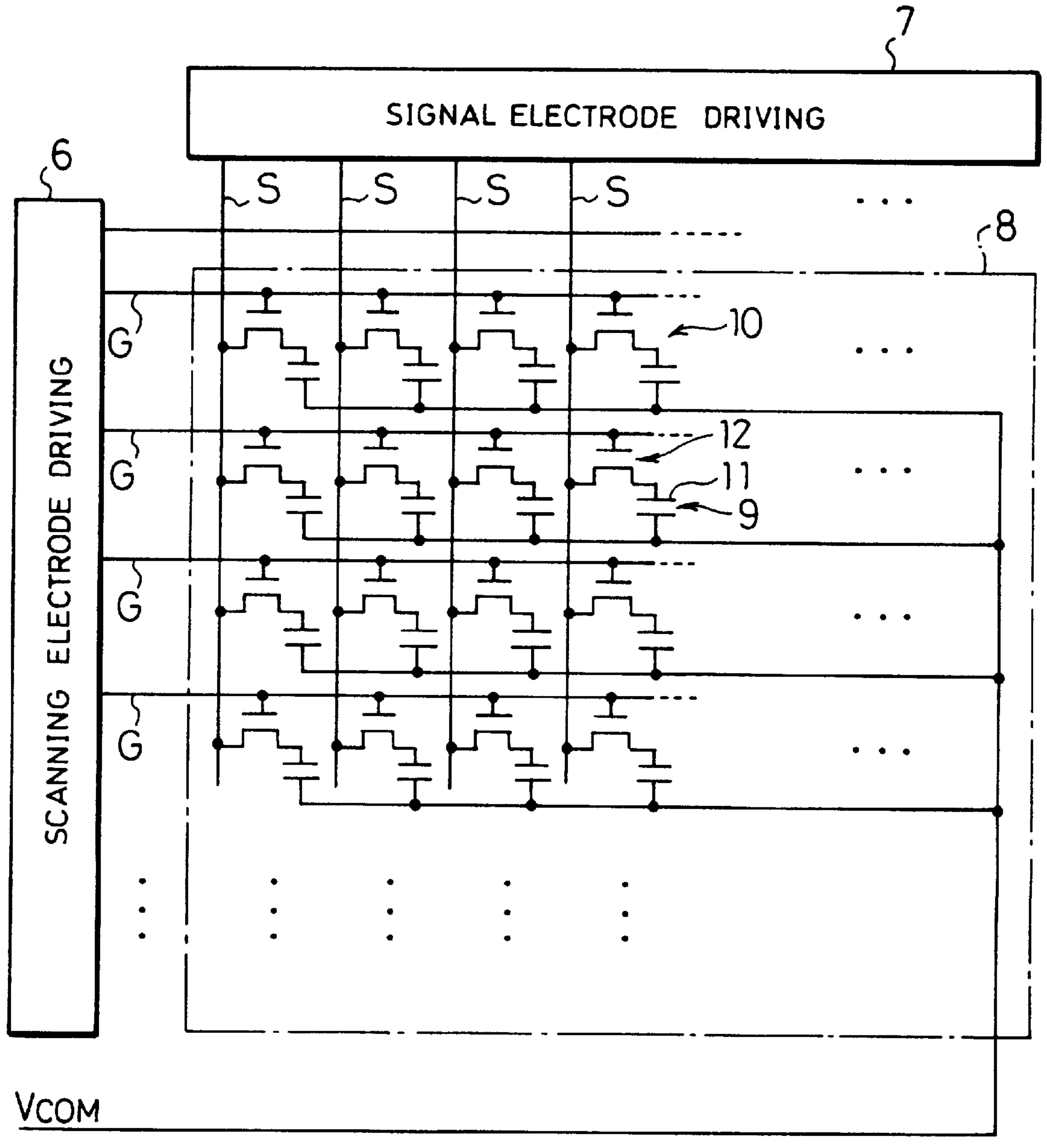
FIG. 9 is an explanatory drawing which shows a display section and a driving circuit in the liquid crystal display device.

A matrix-type display device according to the present embodiment is an active-matrix-type liquid crystal display device in which switching elements are provided respectively to picture elements. As shown in FIG. 9, this liquid crystal display device is provided with a display 8 which displays an image based on a video signal to be inputted. Liquid crystal 9, which modulates a incident light emitted from emitting means, is sealed into the display 8, and the display 8 is provided with picture elements 10 in a matrix pattern. The picture elements 10 compose a display screen. Moreover, a plurality of scanning electrodes G which are vertical lines are placed so as to be parallel with each other. A plurality of signal electrodes S are placed so as to respectively intersect perpendicularly to the scanning electrodes G. The scanning electrodes G are connected to a scanning electrode driving circuit 6, whereas the signal electrodes S are connected to a signal electrode driving circuit 7.

Picture element electrodes 11 of the picture elements 10 are connected respectively to the corresponding signal electrodes S in the vicinities via switching elements 12 which are provided respectively to the picture elements 10. Moreover, gate sections of the switching elements 12 are connected respectively to the corresponding scanning electrodes G in the vicinities. The scanning electrodes G are successively selected by the scanning electrode driving circuit 6, and when an ON signal is applied to the selected scanning electrode G, the switching element 12 connected to this scanning electrode G turns a conducting state between the signal electrode S and the picture element electrode 11. At this time, a signal voltage, which is applied from the signal electrode driving circuit 7 to the signal electrode S, is applied to the picture element electrode 11 based on a video signal to be inputted. In other words, when the scanning electrode G which is a vertical line is selected by the scanning electrode driving circuit 6, a signal voltage based on a video signal is written to the picture element 10 on this line.

An alignment state of the liquid crystal 9 is changed according to the signal voltage, and an incident light is modulated by the liquid crystal 9 so that an image based on a video signal is displayed on a display screen composed of the matrix-arranged picture elements 10.

A three-terminal transistor or a two-terminal diode, etc. can be used as the switching elements 12, but in the present embodiment, a thin film transistor (TFT) is used.

The following describes a driving example of the above liquid crystal display device, in which when the display screen has a wide aspect ratio of 16:9, and a number of scanning electrodes G, i.e., a number of vertical lines (Y) is 240 in the display screen, an image based on an EDTV2 signal in which a number of scanning lines per field (X) is 180 is displayed on the whole display screen without a non-image portion.

Figure 10:
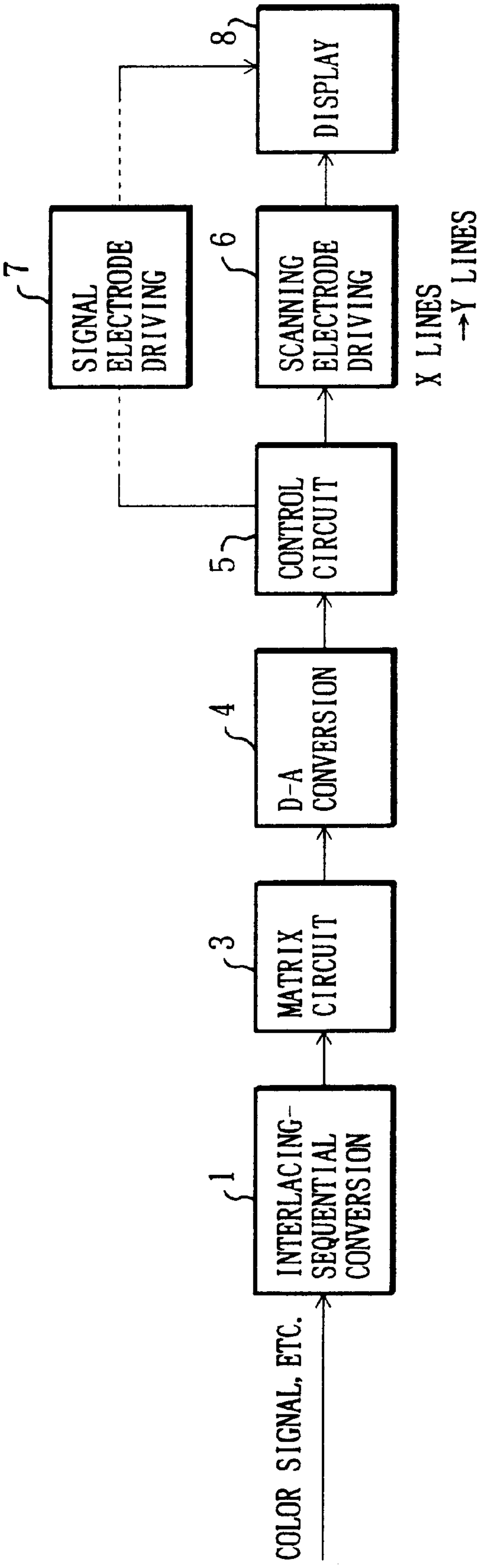
FIG. 10 is a block diagram which shows one section of a series of a signal processing circuit for processing the video signal in the liquid crystal display device.

FIG. 10 shows a portion of a series of signal processing circuits for processing an EDTV2 signal when the EDTV2 signal is inputted as a video signal. As shown in the drawing, color signals, etc. of the EDTV2 signal are processed successively in an interlace-sequence converting circuit 1, a matrix circuit 3, a D-A converter 4, and a control circuit 5, and the processed signal is inputted into the scanning electrode driving circuit 6 and the signal electrode driving circuit 7. An image based on the EDTV2 signal is displayed on the display 8 by driving of both the driving circuits 6 and 7.

The interlacing-sequential converting circuit 1 converts signals for interlaced scanning to be inputted into signals for sequential scanning. The matrix circuit 3 converts color-difference signals, etc. to be inputted into red, green and blue signals required for driving image display. Moreover, the D-A converter 4 converts a digital signal to be inputted into an analog signal, and the control circuit 5 generates control signals in a vertical direction and a horizontal direction based on a synchronizing signal to be inputted, and transmits the control signals into the driving circuits 6 and 7.

Figure 11:
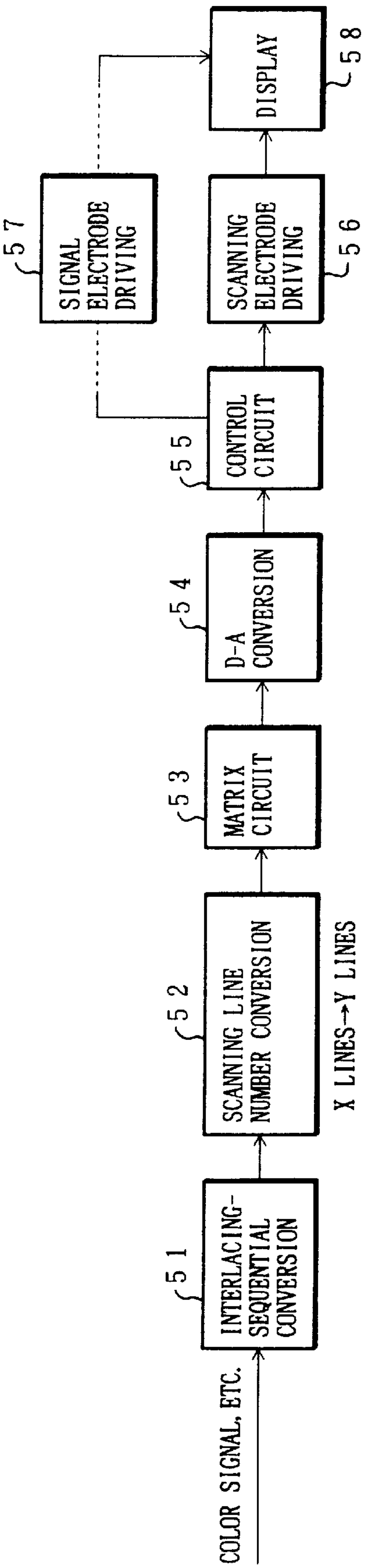
FIG. 11 is a block diagram which shows one section of a series of a signal processing circuit for processing the video signal in a conventional liquid crystal display device.

In the above signal processing, since a number of scanning lines is converted from 180 into 240 in the scanning electrode driving circuit 6, the scanning line number converting circuit 52 shown in FIG. 11 is not required. Namely, a complicated circuit and a large capacity of a memory are not required, thereby lowering costs.

Figure 2:
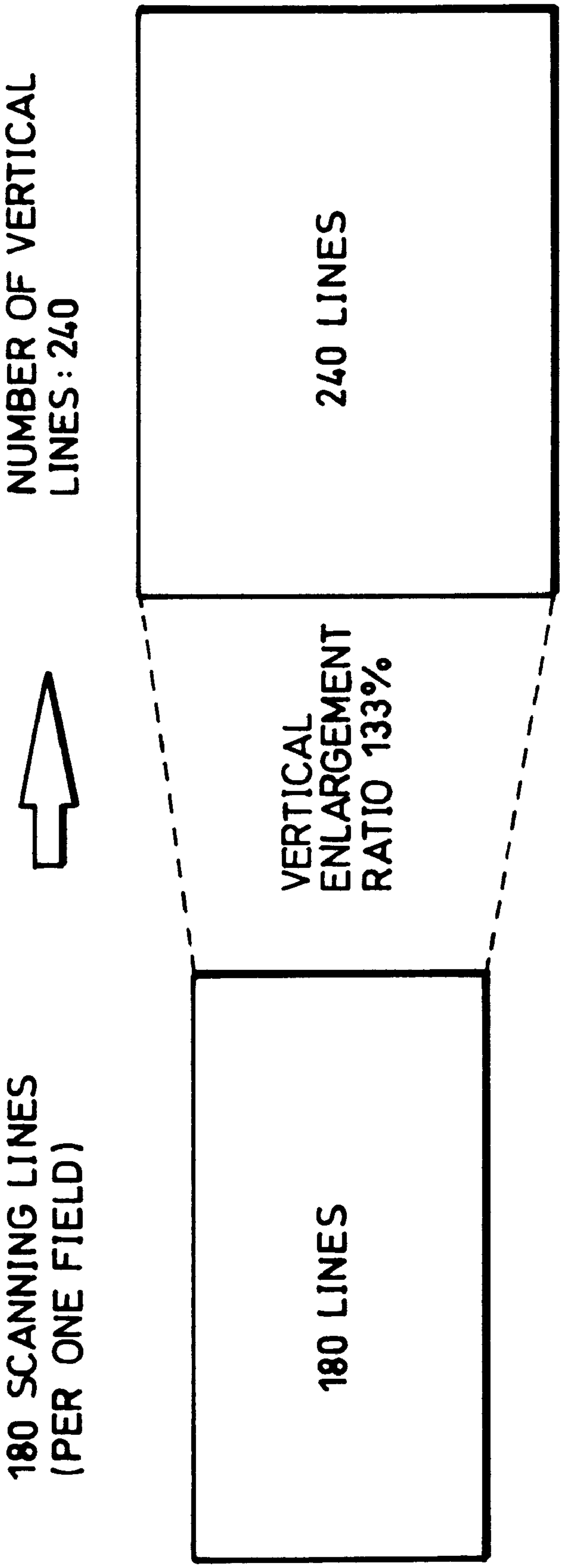
FIG. 2 is an explanatory drawing which shows a vertical enlargement ratio in the case where the image, which is based on the video signal in which a number of scanning lines is 180 per field, is displayed on 240 vertical lines.

As shown in FIG. 2, if an image based on a video signal in which a number of scanning lines per field is 180 is displayed by 240 vertical lines, a number of lines should be changed by 4/3 times (vertical enlargement ratio: 133%). Therefore, the scanning electrode driving circuit 6 adopts the following driving method, controlled by the control circuit 5.

As shown in FIG. 1, a 1+ signal of an odd field signal is written simultaneously into the vertical lines G1 and G2. Then, a 3− signal is written into the next vertical line G3, and a 5+ signal is written into the vertical line G4. Thereafter, a 7− signal is written simultaneously into the two vertical lines G5 and G6. The 1+ signal is a signal having + polarity in the first scanning line in the odd field, and the 3− signal is a signal having − polarity in the second scanning line in the odd field.

As shown in FIG. 1, the same driving as the above is repeated as to the following vertical lines, and thus, at the end, a 359− signal is written into the vertical line G240. After the writing of the odd field is completed, a signal of an even field is written into the vertical line G1.

Similarly to the odd field, in the even field, a 2− signal is written simultaneously into the two vertical lines G1 and G2. Then, a 4+ signal is written into the next vertical line G3, and a 6− signal is written into the vertical line G4. Thereafter, a 8+ signal is written simultaneously into the two vertical lines G5 and G6. The same driving as the above is repeated also for the following vertical lines, and thus, at the end, a 360+ signal is written into the vertical line G240. After the writing of the signals of the even field is completed, a next signal in the odd field is written into the vertical line G1.

As mentioned above, when a signal is written simultaneously into two vertical lines in one in every three scanning lines of the EDTV2 signal, an image based on the EDTV2 signal in which a number of scanning lines is 180 per field can be displayed on the whole display screen of a liquid crystal module having 240 vertical lines without a non-image portion.

In the driving shown in FIG. 1, respective two vertical lines into which the same signal is simultaneously written in the odd field are identical with the two lines into which the same signal is simultaneously written in the even field, but driving shown in FIG. 3 or 4 can also adopted.

FIG. 3 shows a driving example when two vertical lines, into which the same signal is simultaneously written, are different between the odd field and the even field. As shown in the drawing, in the odd field, the same driving as FIG. 1 is repeated, and thus a signal is written into the respective vertical lines. Then, in the even field, a 0+ signal is written simultaneously into a vertical line G0 out of the display screen and the vertical line G1. Next, a 2− signal is written into the vertical line G2, and a 4+ signal is written into the vertical line G3. A 6− signal is written simultaneously into the two vertical lines G4 and G5. The above driving is repeated for the following vertical lines, and thus, at the end, a 360+ signal is written into the vertical line G240. After the writing of the signals of the even field is completed, a signal of the odd field is written first into the vertical line G1. In such a manner, an image based on the EDTV2 signal in which a number of scanning lines is 180 per field can be displayed on the whole display screen of the liquid crystal module having 240 vertical lines.

FIG. 4 shows a driving example when in the even field the same signal is written simultaneously into two vertical lines, into which in the odd field the same signal was not written simultaneously. As shown in the drawing, the same driving as FIG. 1 is repeated in the odd field, and thus a signal is written into the respective vertical lines. Then, in the even field, after a 0− signal is written into the vertical line G1, a 2+ signal is written into the vertical line G2 (Note that the 1+ signal was written simultaneously into the vertical lines G1 and G2 in the odd field). Thereafter, a 4− signal is written simultaneously into the two vertical lines G3 and G4. Next, a 6+ signal is written into the vertical line G5, and a 8− signal is written into the vertical line G6. The same driving as the above is repeated for the following vertical lines, and thus at the end, a 360− signal is written into the vertical line G240. After the writing of the signals in the even field is completed, a signal of the odd field is written into the vertical line G1. In such a manner, an image based on the EDTV2 signal in which a number of scanning lines is 180 per field can be displayed on the whole display screen of the liquid crystal module having 240 vertical lines.

As shown in FIG. 2, in the aforementioned driving examples, the driving was executed so that the vertical enlargement ratio of the signals is uniformly changed by 4/3 times (=133%) on the whole display screen. The following describes a driving example which controls a rate of writing a signal simultaneously into two vertical lines according to an area of the display screen.

Figure 5:
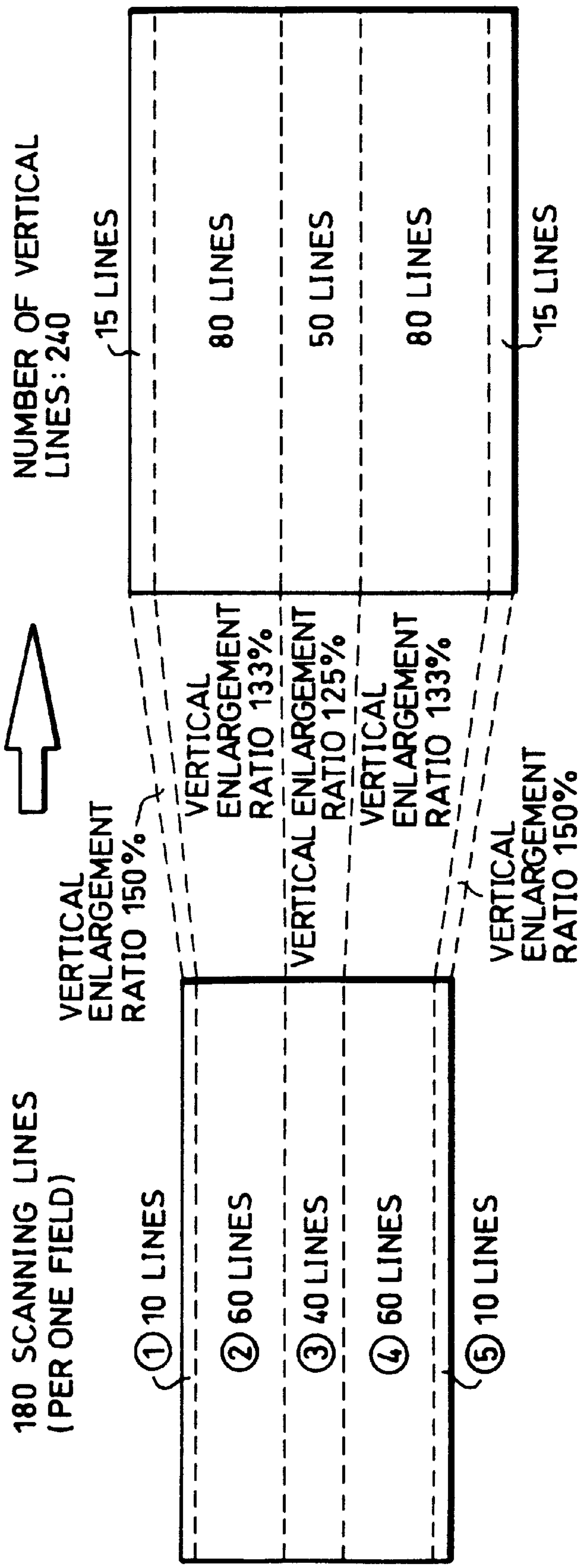
FIG. 5 is an explanatory drawing which shows a driving example which controls a rate of writing a video signal simultaneously into two vertical lines according to an area of the display screen in the liquid crystal display device.

FIG. 5 shows a driving example which suppresses the vertical enlargement ratio on the central portion of the display screen more than the top and bottom of the display screen so that a more natural and wider image can be displayed. When an image based on a video signal in which a number of scanning lines is 180 per field is displayed on a liquid crystal module having 240 vertical lines, as mentioned later, the rate of writing a signal simultaneously into two lines is changed according to the area of the display screen, and the vertical enlargement ratio is made to be 4/3 times (=133%) on the whole display screen.

In ① portion corresponding to the first through tenth scanning lines, when a signal is written simultaneously into the two vertical lines in one in every two scanning lines, an image based on the signal is displayed on the first through fifteenth vertical lines (vertical enlargement ratio: 3/2 times=150%). In ② portion corresponding to the eleventh through seventieth scanning lines, when a signal is written simultaneously into the two lines in one in every three scanning lines, an image is displayed on the sixteenth through ninety-fifth vertical lines (vertical enlargement ratio: 4/3 times=133%). In ③ portion corresponding to the seventy-first through one-hundred tenth scanning lines, when a signal is written simultaneously into the two lines in one in every four scanning lines, an image is displayed on the ninety-sixth through one-hundred-forty-fifth vertical lines (vertical enlargement ratio: 5/4 times=125%). In ④ portion corresponding to the one-hundred-eleventh through one-hundred seventieth scanning lines, when a signal is written simultaneously into the two lines in one in every three scanning lines, an image is displayed on the one-hundred-forty-sixth through two-hundred-twenty-fifth vertical lines (vertical enlargement ratio: 4/3 times=133%). Then, in ⑤ portion corresponding to the one-hundred-seventy-first through one-hundred eightieth scanning lines, when a signal is written simultaneously into the two lines in one in every two scanning lines, an image is displayed on the two-hundred-twenty-sixth through two-hundred-fortieth vertical lines (vertical enlargement ratio: 3/2 times=150%).

In the above manner, the vertical enlargement ratio on the whole display screen is made to be 4/3 times, and an image based on a signal in which a number of scanning lines is 180 per field can be displayed on the whole display screen of the liquid crystal module having 240 vertical lines with the vertical enlargement ratio on the central portion being suppressed.

Figure 6:
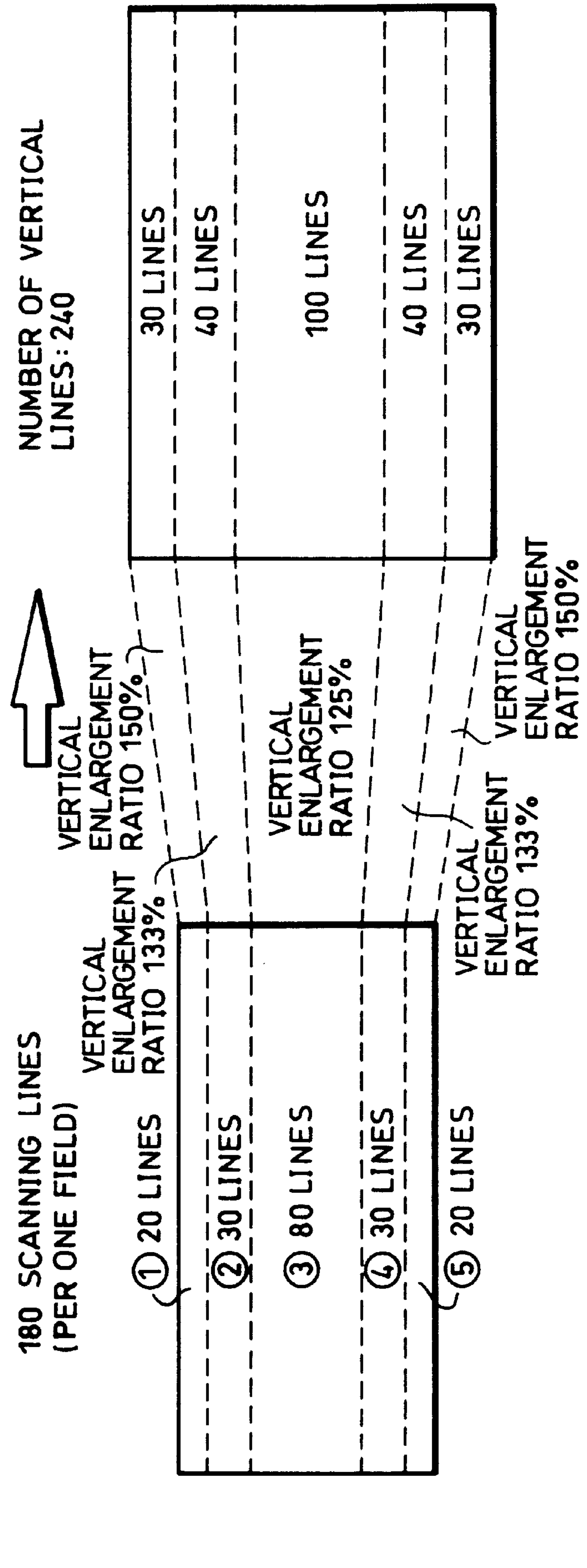
FIG. 6 is an explanatory drawing which shows an example where a number of scanning lines on each portion is changed in the driving example shown in FIG. 5.

FIG. 6 shows an example that a number of scanning lines on each portion in the driving example of FIG. 5 is changed. Namely, a number of scanning lines of the ① and ⑤ portions, where a signal is written simultaneously into two lines in one in every two scanning lines, is set to 20 (10 in FIG. 5), and a number of scanning lines of the ② and ④ portions, where a signal is written simultaneously into two lines in one in every three scanning lines, is set to 30 (60 in FIG. 5). Moreover, a number of scanning lines of the ③ portion, where a signal is written simultaneously into two lines in one in every four scanning lines, is set to 80 (40 in FIG. 5). As a result, an image can be displayed on the whole display screen with a number of lines on the central portion of the display screen whose vertical enlargement ratio is suppressed being increased.

Figure 7:
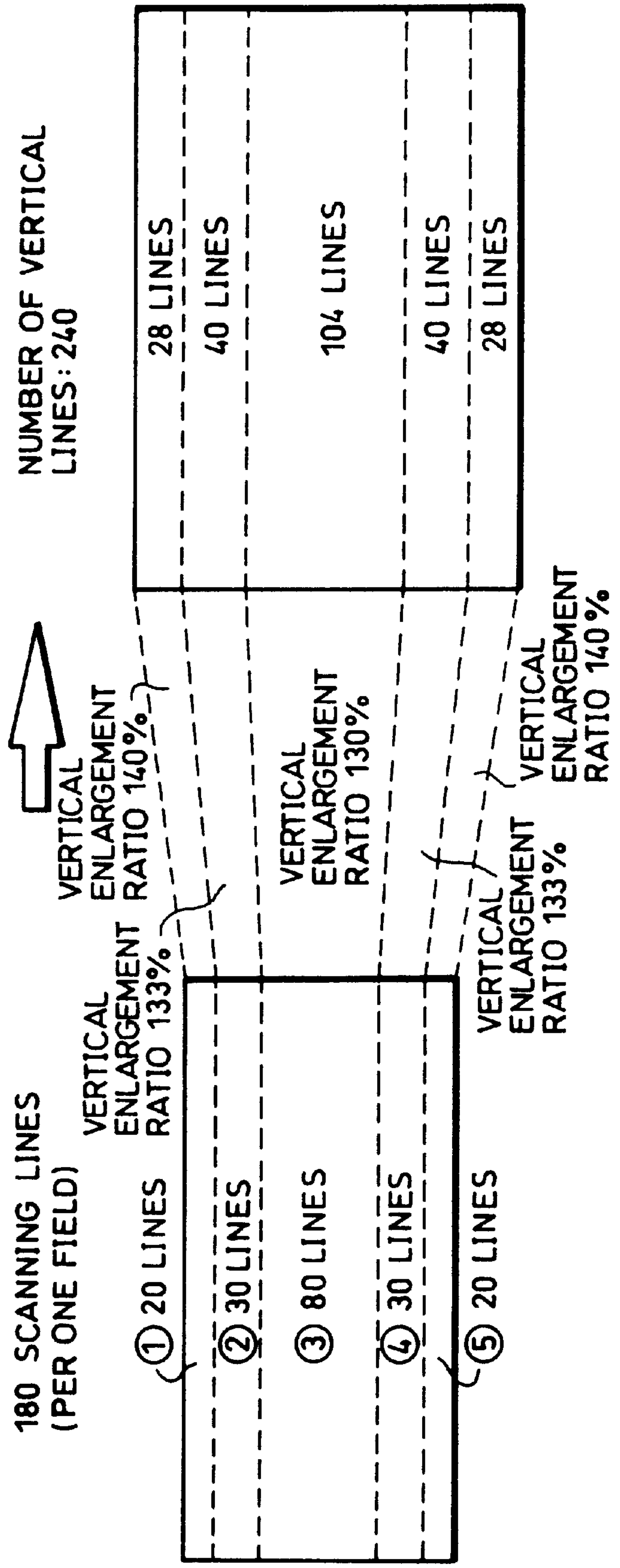
FIG. 7 is an explanatory drawing which shows a driving method where a difference in the vertical enlargement ratio between a central portion and top/bottom portions of the display screen is suppressed to 10% in the liquid crystal display device.
Figure 8:
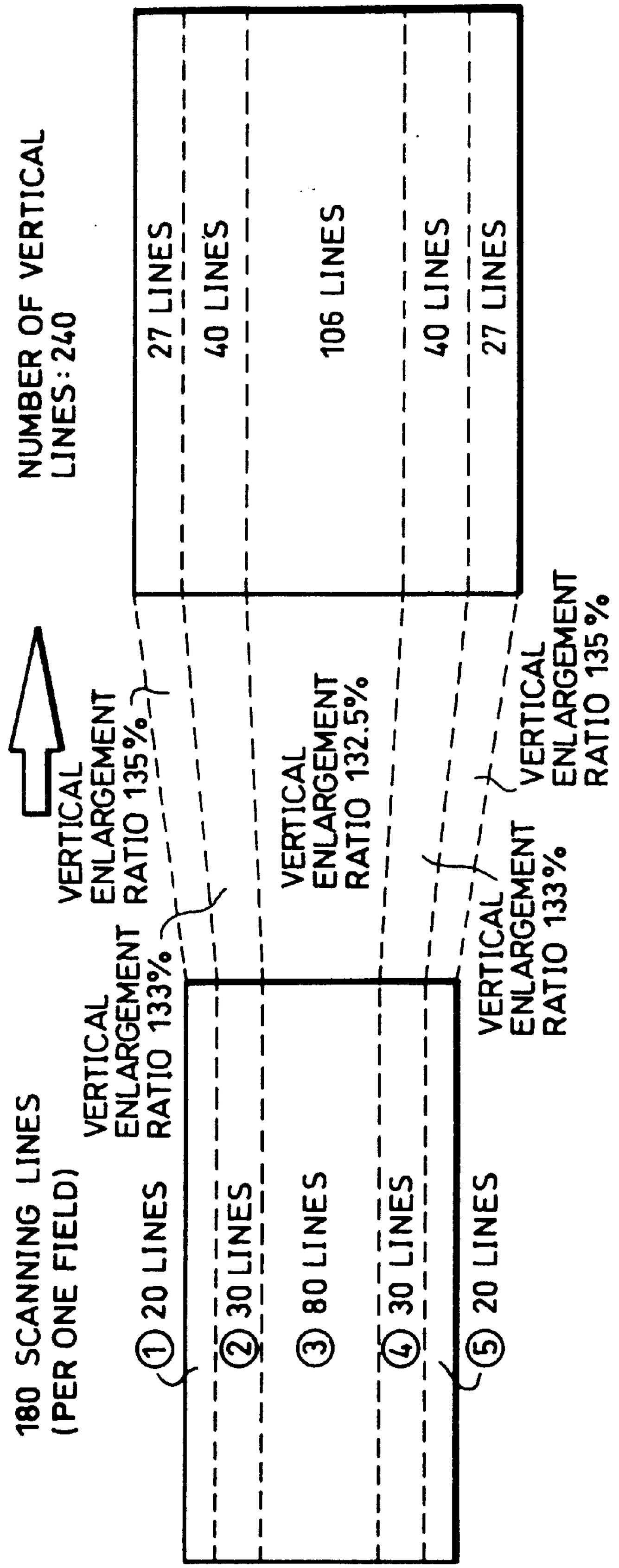
FIG. 8 is an explanatory drawing which shows a driving method where a difference in the vertical enlargement ratio between a central portion and top/bottom portions of the display screen is suppressed to 2.5% in the liquid crystal display device.

In the driving examples shown in FIGS. 5 and 6, a difference in the vertical enlargement ratio between the central portion of the display screen and the top/bottom portions of the display screen was 25%, but the following describes a driving example, in which a difference in the vertical enlargement ratio is smaller, on reference to FIGS. 7 and 8.

FIG. 7 shows the driving example in which a difference between the central portion and the top/bottom portion in the vertical enlargement ratio is suppressed to 10%. In the ① and ⑤ portions where a number of scanning lines is 20, when a signal is written simultaneously into two lines on one part, an image is displayed on 28 of the vertical lines (vertical enlargement ratio: 140%). In the ② and ④ portions where a number of scanning lines is 30, when a signal is written simultaneously into two lines in one in every three scanning lines, an image is displayed on 40 of the vertical lines (vertical enlargement ratio: 133%). Then, in the ③ portion where a number of scanning lines is 80, when a signal is written simultaneously into two lines on one part, an image is displayed on 104 of the vertical lines (vertical enlargement ratio: 130%).

In addition, FIG. 8 shows a driving example where a difference in the vertical enlargement ratio between the central portion and the top/bottom portions of the display screen is suppressed to 2.5%. In the ① and ⑤ portions where a number of scanning lines is 20, when a signal is written simultaneously into two lines in one part, an image is displayed on 27 of the vertical lines (vertical enlargement ratio: 135%). In the ② and ④ portions where a number of scanning lines is 30, when a signal is written simultaneously into two lines in one in every three scanning lines, an image is displayed on 40 of the vertical lines (vertical enlargement ratio: 133%). Then, in the ③ portion where a number of scanning lines is 80, when a signal is written simultaneously into two lines on one part, an image is displayed on 106 of the vertical lines (vertical enlargement ratio: 132.5%).

As mentioned in the aforementioned driving examples, when a rate of writing a signal simultaneously into two lines, is controlled according to an area of the display screen, more natural image can be displayed.

The above driving examples explain the arrangement that a signal is written simultaneously into two vertical lines at a part of every predetermined period, but an arrangement is not limited to this, so a driving example may be arranged so that a signal is written simultaneously into not less than three vertical lines at a part of every predetermined period. However, note that when a number of vertical lines into which a signal is written simultaneously is set to 2, a smoother image can be displayed.

In addition, the rate of writing in each area of the display screen may be controlled by changing a number of vertical lines, into which a signal is written simultaneously at a part of every predetermined period, according to an area of the display screen. For example, the rate of writing can be also controlled in a following manner; i.e., on the top/bottom portions of the display screen, a video signal is written simultaneously into three vertical lines at a part of every predetermined period, whereas on the central portion of the display screen, a video signal is written simultaneously into two vertical lines at a part of the predetermined period.

The matrix-type display device of the present embodiment is an active-matrix-type liquid crystal display device, but the present invention is applicable to an active-matrix-type liquid crystal display device having an arrangement other than the aforementioned arrangements, to a liquid crystal display device which is not active-matrix-type, and to a matrix-type display device other than a liquid crystal display device.

As mentioned above, the matrix-type display device of the present embodiment, which is a liquid crystal display device having 240 vertical lines in the display screen, includes the scanning electrode driving circuit 6 for when an image based on a video signal having 180 scanning lines per field is displayed on the display screen, writing a video signal simultaneously into a plurality of lines of vertical lines at a part of a predetermined period.

In such a manner, when a video signal is written simultaneously into a plurality of vertical lines for one portion of a predetermined period, an image based on the video signal can be displayed on the whole display screen without a non-image portion.

In addition, a lot of hardware and a complicated circuit are not required, and thus a decrease in fraction defective and simplification of a device can result in a decrease in costs. For this reason, a matrix-type display device, which is capable of displaying a realistic image with high quality on a wide display screen, can be provided at a low price.

In addition, in the above arrangement, it is preferable that the scanning electrode driving circuit 6 controls the rate of writing the video signal simultaneously into a plurality of vertical lines according to an area of the display screen.

In such a manner, when the rate of writing a video signal simultaneously into a plurality of vertical lines is controlled according to an area of the display screen, a desirable vertical enlargement ratio can be realized according to an area of the display screen. The writing rate can be controlled by changing a predetermined period according to an area of the display screen as mentioned above, for example. More specifically, on the top/bottom portions of the display screen, for a selecting period for selecting A-numbered vertical lines, a video signal is written simultaneously into C-numbered ($C \geqq 2$) vertical lines of the A-numbered vertical lines, whereas on the central portion of the display screen, for a selecting period for selecting B-numbered ($A \neq B$) vertical lines, a video signal is written simultaneously into C-numbered vertical lines of the B-numbered vertical lines.

In another way, the writing rate can be controlled by changing a number of vertical lines into which a video signal is written simultaneously for one portion of the predetermined period according to an area of the display screen. More specifically, on the top/bottom portions of the display screen, for the selecting period for selecting A-numbered vertical lines, a video signal is written simultaneously into C-numbered vertical lines of the A-numbered vertical lines, whereas on the central portion of the display screen, for the selecting period for selecting A-numbered vertical lines, a video signal is written simultaneously into D-numbered ($C \neq D$) vertical lines.

As a result, the vertical enlargement ratio on the central portion of the display screen can be suppressed more easily compared with the top/bottom portions of the display screen, thereby displaying more natural image.

In addition, in the above arrangement, it is preferable that a number of vertical lines into which the video signal is written simultaneously is two.

In accordance with this arrangement, a video signal is written simultaneously into two vertical lines for one portion of a predetermined period, i.e., the selecting period for successively selecting a plurality of vertical lines, thereby displaying an image on the whole display screen without a non-image portion.

A video signal may be basically written simultaneously into any number of vertical lines, but if the number is set to two, a more smooth image can be displayed, and the arrangement of the driving circuit can be simplified.

In addition, in the above arrangement, it is preferable that the video signal is a wide EDTV2 signal in which a number of scanning lines on the main image portion is 180 per field, and the display screen has a wide aspect ratio which is wider than the aspect ratio of 4:3.

In accordance with this arrangement, in the matrix-type display device having the display screen with a wide aspect ratio of 16:9, for example, if an image, which is based on the EDTV2 signal in which a number of scanning lines is 180 TVs per field, is displayed, a video signal is written simultaneously into a plurality of vertical lines for one portion of a predetermined period. As a result, the image based on the EDTV2 signal can be displayed on the wide whole display screen without a non-image portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A matrix-type display device, comprising:

a display screen having Y vertical lines, so that, when a video signal has Y scanning lines, each scanning line is written into a corresponding one of vertical lines; and a driving circuit for, when an image based on a video signal having X ($X<Y$) scanning lines is displayed on the display screen, writing the video signal for a minor proportion of said scanning lines simultaneously into two of said vertical lines, so as to enlarge the image in a vertical direction, said minor proportion of said scanning lines being distributed over said display screen.

2. The matrix-type display device according to claim 1, wherein said driving circuit controls the rate of said minor portion of said scanning lines are simultaneously written to two of said vertical lines according to the area of the display screen.

3. The matrix-type display device according to claim 1, wherein the video signal is a wide EDTV2 signal in which a number of scanning lines on a main display portion is 180 per field, and the display screen has a wide aspect ratio which is wider than an aspect ratio of 4:3.

4. The matrix-type display device according to claim 2, wherein the video signal is a wide EDTV2 signal in which a number of scanning lines on a main display portion is 180 per field, and the display screen has a wide aspect ratio which is wider than an aspect ratio of 4:3.

5. The matrix-type display device according to claim 1, wherein the predetermined period is a selecting period for selecting four vertical lines, and the video signal is written simultaneously into two of the four vertical lines.

6. The matrix-type display device according to claim 5, wherein the two vertical lines to which the video signal is written simultaneously is different between an odd field and an even field.

7. The matrix-type display device according to claim 2, wherein the rate of writing the video signal simultaneously into said plurality of vertical lines is controlled so that a vertical enlargement ratio on a central portion of the display screen is suppressed more than top/bottom portions of the display screen.

8. The matrix-type display device according to claim 7, wherein the rate of writing the video signal simultaneously into said plurality of vertical lines is controlled so that a difference in the vertical enlargement ratio between the central portion and the top/bottom portions of the display screen becomes not more than 10%.

9. The matrix-type display device according to claim 1, is an active-matrix-type liquid crystal display device in which switching elements are provided respectively to picture elements.

10. The matrix-type display device according to claim 9, wherein said switching elements are thin film transistors.

11. The matrix-type display device according to claim 1, wherein the display screen has an aspect ratio of about 16:9.

* * * * *